United States Patent Office 2,706,177
Patented Apr. 12, 1955

2,706,177

STABILIZATION OF ORGANIC SULFUR-CONTAINING COMPOUNDS

Thomas S. Tutwiler, Plainfield, Fred B. Fischl, Springfield, and Elmer B. Cyphers, Cranford, N. J., assignors to Esso Research and Engineering Company, a corporation of Delaware No Drawing. Application July 24, 1952,
Serial No. 300,756

11 Claims. (Cl. 252—46.6)

This invention relates to an improved method of minimizing the evolution of hydrogen sulfide from organic sulfur-containing compounds from which hydrogen sulfide is normally evolved.

Many organic sulfur-containing compounds normally evolve hydrogen sulfide during storage, transportation or use. Frequently, it is desired to use such compounds as additives for mineral oil compositions, such as lubricating oils, to impart to the composition various desired properties such as extreme pressure properties, anti-corrosive properties, detergent properties and the like. However, compositions comprising even small amounts of unstable sulfur-containing compounds will evolve hydrogen sulfide in objectionable quantities. Users of such compositions object to these odors, and consequently the saleability of the product is impaired. Many organic compounds that have been sulfurized by treatment with sulfur, sulfides of phosphorus and the like show this characteristic unstability with respect to hydrogen sulfide evolution.

It has been found, in accordance with the present invention, that the tendency of organic sulfur-containing compounds to evolve hydrogen sulfide may be minimized or eliminated by adding to such materials a minor, inhibiting amount of an organic ether containing at least one olefinic double bond. These unsaturated ethers improve the stability of the sulfur-containing materials and of mineral oil blends containing small amounts of the stabilized material.

The preferred organic ethers have the formula ROR wherein the R groups represent hydrocarbon radicals, at least one of which has at least one olefinic double bond. The unsaturated hydrocarbon radicals are preferably aliphatic in nature. They include vinyl, allyl, butenyl, hexenyl, octenyl, dodecenyl, ocenyl, cyclohexenyl, ethylcyclohexenyl, propylcyclohexenyl, allylcyclohexenyl, vinylcyclohexenyl, and the like olefinic and cycloolefinic hydrocarbon radicals. Partly aromatic radicals, like styryl and vinyl-toluyl can also be represented by R.

Both of the R radicals may be unsaturated in nature, or one of them may be a saturated aliphatic or aromatic hydrocarbon group. Such non-olefinic radicals include ethyl, propyl, isobutyl, isoamyl, 2-ethylhexyl, octyl, dodecyl, cyclohexyl, ethylcyclohexyl, phenyl, cresyl, propylphenyl and the like groupings.

Each of the R groups may contain in the range of 2 to about 20 carbon atoms; those having in the range of about 2 to 10 carbon atoms are generally preferred from the standpoint of availability and utility. Those having an olefinic double bond attached to a carbon atom which in turn is linked to the ether oxygen are generally preferred. Specific unsaturated ethers include divinyl ether, vinyl ethyl ether, vinyl isobutyl ether, vinyl 2-ethylhexyl ether, vinyl ocenyl ether, allyl ethyl ether, allyl isoamyl ether, allyl cresyl ether, phenyl vinyl ether, phenyl allyl ether, and the like.

The amount of unsaturated ether employed, based on the sulfur-containing material, is generally in the range of about 0.1 to 20%, although amounts in the range of about 1 to 10% are generally most useful. The quantity will depend to a large extent upon the degree of unstability of the sulfur-containing material and to some extent on the type of unsaturated ether used. The ether may be blended with the unstable material at room temperature in order to form an intimate mixture. Somewhat better utilization of the ether is obtained, however, by mixing the unstable material and the ether and heating the mixture to a temperature up to as high as about 350° F. and holding the mixture at an elevated temperature for a period of from about 30 minutes to 5 or more hours.

The reason for the effectiveness of the unsaturated ethers for stabilizing sulfur-containing organic compounds is not entirely understood. Possibly, however, the ether reacts with loosely bound or unstable sulfur in the compound thereby preventing evolution of hydrogen sulfide on storage or on use at elevated temperatures.

The present invention has particular application to the improvement of sulfurized organic compounds prepared by treating organic compounds with sulfur, sulfides of phosphorus, such as phosphorus pentasulfide and phosphorus sesquisulfide, etc., their mixtures and other sulfurizing agents well known to the art. The organic compounds that are sulfurized are also well known to the art, such as various hydrocarbons, etc.

Other organic compounds that may be sulfurized include the organic acids, particularly the higher carboxylic acids, esters, petroleum acids, naphthenic acids, higher alcohols, ketones and aldehydes, and other oxygen containing compounds. Phenols such as the alkyl phenols, alkyl phenol sulfides and the like are particularly valuable as feed stocks for sulfurization to make lubricant additives. Other organic compounds include amines, and fatty oils of animal and vegetable origin such as sperm oil, degras, and the like.

Frequently, the acidic sulfurized organic material is treated with a basic material for neutralization purposes or to introduce a metal component into the material. The treatment of the present invention may be applied before neutralization. It is also effective in preventing $H_2S$ evolution from neutralized materials in those cases where the neutralized compound normally evolves $H_2S$ as heretofore described.

It is also sometimes desirable to treat sulfurized or phosphosulfurized materials with an active olefinic hydrocarbon such as diisobutylene, dipentene and the like, at an elevated temperature to stabilize the material at least partially. In such cases it has generally been found that pre-treatment with the unsaturated hydrocarbon alone is not enough to stabilize completely the material being treated. The addition of the small amount of an unsaturated ether as described heretofore will substantially eliminate subsequent evolution of hydrogen sulfide.

The additives of the present invention also have application to the stabilization of sulfurized metal salts of organic compounds. For example, metal alkyl phenol sulfides that have been treated with elemental sulfur sometimes evolve objectionable quantities of $H_2S$. The addition of an unsaturated ether is quite effective in stabilizing such materials.

The improved products of the present invention may be used as additives for mineral oils such as lubricating oils, greases, heating oils, gasolines and the like. Amounts in the range of about 0.01 to 10% by weight may be used depending on the property of the composition to be improved. The stable agents find use as anti-oxidants and corrosion inhibitors, extreme pressure additives, detergents, sludge disperses and the like. When the sulfurized materials, treated in accordance with the present invention, are used in such compositions, the resulting blends have substantially no tendency to evolve $H_2S$ even when subjected to elevated temperatures.

The sulfurized organic compound may be dissolved in a solvent before treatment. Thus, a lubricant base stock containing in the range of about 20 to 50% by weight of the unstable compound may be treated with the unsaturated ether as described above. The treated concentrate is then stored and shipped in that form. A finished lubricant is prepared by blending the needed amount of the concentrate with a lubricant base stock to obtain any desired concentration. The finished lubricant may comprise, in addition to the sulfur-containing material, other additives well known to the art such as viscosity index improvers, pour depressants, detergents, etc.

The practice of the present invention will be illustrated in connection with the following examples, although the invention is not to be construed as being limited by these examples in any way.

EXAMPLE 1

Several sulfur-containing organic compounds, that were unstable with respect to hydrogen sulfide evolution, were treated in accordance with the present invention. In one case, the sulfur-containing material was a de-asphalted, dewaxed, acid and clay-treated Panhandle bright stock that had been treated with phosphorus pentasulfide at an elevated temperature. The resulting phosphosulfurized hydrocarbon was quite unstable with respect to hydrogen sulfide evolution.

In another case, the material was the above phosphosulfurized bright stock that had been subsequently treated with about 10% by weight of commercial dipentene at a temperature of about 380° F. The dipentene treatment was employed to improve the detergency and stability characteritsics of the sulfurized bright stock. The treated material, however, evolved $H_2S$ on storage.

Another material tested was a conventionally sulfurized dipentene prepared by treating commercial dipentene with elemental sulfur.

In the case of each of the above materials, blends were prepared containing various amounts of various unsaturated ethers. Each of the blends was then tested for $H_2S$ evolution tendencies. The test was carried out as follows: A 4-ounce bottle was filled about ¾ full with the product and stoppered with a tinfoil-covered cork. The bottles were then stored at room temperature or at 140° F. for times ranging up to 27 days. Periodically, the stoppers were removed, and a filter paper that had been dipped in saturated lead acetate solution just prior to the test was placed over the bottle opening. The saturated paper was exposed to the bottle opening for times in the range of 1 to 300 seconds, in order to obtain hydrogen sulfide ratings after various exposure times. Each of the test papers was then removed, dried and given an "$H_2S$ rating" by comparison with a set of standards in which "0" represents no stain and "10" represents a heavy, black metallic stain. Each of the products containing no unsaturated ether additive was also tested for comparative purposes. The results of these tests are shown in Table I, below:

EXAMPLE 2

Lubricating oil blends were prepared containing 10% of the dipentene-treated phosphosulfurized bright stock of Example 1 in a mineral lubricant base stock having an 80 S. U. S. viscosity at 210° F. One blend contained no unsaturated ether. Two other blends contained 2.0% and 4.0%, respectively, of vinyl isobutyl ether, based on the phosphosulfurized additive. The blends were stored at room temperature for 14 days and then tested for $H_2S$ evolution by the procedure described in Example 1. The results of these tests are shown in Table II below.

TABLE II

*Effect of unsaturated ethers on the $H_2S$ evolution tendencies of lubricant blends formulated with sulfurized materials*

| Vinyl Isobutyl Ether in Blend, wt. percent based on Dipentene Treated Phosphosulfurized Hydrocarbon | $H_2S$ Rating on Oil Blend after 14 Days' Storage | | |
|---|---|---|---|
| | 1* | 5* | 30* |
| 0 | 5 | 10 | 10+ |
| 2 | 3 | 8 | 9 |
| 4 | 2 | 5 | 6 |

*Exposure time, seconds, for paper saturated with lead acetate.

The oil blends containing a small amount of the unsaturated ether were considerably superior to the blend containing none of this material. It is noted that the oil blend containing the dipentene-treated additive is even more unstable than the additive concentrate. Although the reverse is generally the case with most sulfurized additives, it has been observed that hydrocarbons treated with phosphorus pentasulfide and their derivatives are sometimes more unstable in oil blends than in concentrated form. As yet the reason for this phenomenon has not been determined.

The present invention contemplates improving various unstable sulfurized organic compounds. It has particular application to hydrocarbons such as olefins, olefin polymers, diolefins, acetylenes, aromatics, petroleum frac-

TABLE I

*Effect of unsaturated ethers on $H_2S$ evolution tendencies of sulfurized materials*

| Material Tested | | $H_2S$ Rating | | | | | | | |
|---|---|---|---|---|---|---|---|---|---|
| | | Phosphosulfurized Bright Stock | | | Dipentene-Treated Phosphosulfurized Bright Stock | | | Sulfurized Dipentene** | |
| Exposure Time, Seconds | | 1 | 5 | 30 | 1 | 5 | 30 | 60 | 300 |
| Ether Employed, Wt. Percent, Based on Sulfurized Material | Storage Time, Days | | | | | | | | |
| None | 18–21 | 10+ | 10+ | 10+ | 5 | 10+ | 10+ | 7 | 10 |
| Vinyl Ethylhexyl: 1% by Wt | 18–21 | * | * | * | 0 | 1+ | 10 | * | * |
| Vinyl Isobutyl: | | | | | | | | | |
| 1% by Wt | 18–21 | * | * | * | * | * | .8 | 4 | 5 |
| 2% by Wt | 18–21 | 5 | 8 | 10 | 0 | 5 | .5 | 1+ | 4 |
| 4% by Wt | 18–21 | 0 | 3 | 8 | 0 | 0 | 3 | * | * |
| 5% by Wt | 18–21 | * | * | * | 0 | 0 | 0 | * | * |
| 7.5% by Wt | 18–21 | 0 | 2 | 7 | * | * | * | * | * |
| 12.0% by Wt | 18–21 | * | * | * | 0 | 0 | 1 | * | * |
| 15% by Wt | 18–21 | 0 | 0 | 1 | * | * | * | * | * |
| None | 6 | * | * | * | 5 | 7 | 10+ | * | * |
| Allyl Phenyl: 2% by Wt | 6 | * | * | * | 0 | 1+ | .6 | * | * |
| Vinyl Ocenyl: 2% by Wt | 6 | * | * | * | 0 | 1+ | 6 | * | * |

*Not determined.
**Both unblended and blended materials stored 27 days at 140° F. before testing for $H_2S$ evolution.

It will be noted that the addition of as low as 1% by weight of the various unsaturated ethers effected substantial improvements in $H_2S$ evolution tendencies. Amounts as high as about 5% to 10% were needed to obtain substantial complete stabilization of the relatively unstable phosphosulfurized bright stock. Amounts in the range of 2% to 5% gave substantially complete stabilization for the relatively more stable dipentene-treated phosphosulfurized bright stock.

tions such as lubricant distillates, residua, petrolatums, and the like. Terpenes such as dipentene, pinenes, and the like are also sulfurized to form effective lubricant additives and the like.

What is claimed is:

1. A mineral oil composition comprising a major proportions of a mineral oil, an organic sulfur-containing material which normally evolves hydrogen sulfide, and in the range of about 0.1% to 20% by weight, based on the sulfur-containing compound, of an organic ether containing at least one olefinic double bond.

2. A lubricant composition comprising a major portion of a lubricant base stock, a minor portion of a sulfurized organic compound which normally evolves hydrogen sulfide, and in the range of about 1% to 10% by weight, based on said sulfurized organic compound, of an ether having the formula ROR in which the R groups are hydrocarbon radicals containing in the range of 2 to 20 carbon atoms and in which at least one of the R groups contains at least one olefinic double bond.

3. A composition as in claim 2 wherein one of said R groups is a vinyl group.

4. A composition as in claim 2 wherein one of said R groups is an allyl group.

5. An improved organic sulfur-containing material which normally evolves hydrogen sulfide containing in combination therewith in the range of about 0.1% to 20% by weight, based on said material, of an organic ether containing at least one olefinic double bond.

6. An improved sulfurized organic compound which normally evolves hydrogen sulfide on storage containing in combination therewith a minor $H_2S$ evolution-inhibiting amount, not substantially exceeding about 20 weight percent of an organic ether having the formula ROR wherein said R radicals are hydrocarbon groups having in the range of 2 to 20 carbon atoms and wherein at least one of said R groups contains at least one olefinic double bond.

7. A composition as in claim 6 wherein one of said R groups is a vinyl group.

8. A composition as in claim 6 wherein one of said R groups is an allyl group.

9. A composition as in claim 6 wherein said sulfurized organic compound is a hydrocarbon treated with elemental sulfur.

10. A composition as in claim 6 wherein said sulfurized organic compound is a hydrocarbon treated with a sulfide of phosphorus.

11. An improved method for stabilizing an organic sulfur-containing compound which normally evolves hydrogen sulfide which comprises the step of mixing said compound with a minor, $H_2S$ evolution-inhibiting amount of an organic ether containing at least one olefinic double bond in the molecule and maintaining the mixture formed at an elevated temperature of up to about 350° F. for a period of time of about 30 to 300 minutes.

References Cited in the file of this patent

FOREIGN PATENTS 660,110   Great Britain ---------- Oct. 31, 1951